US005457600A

United States Patent [19]

Campbell et al.

[11] Patent Number: 5,457,600

[45] Date of Patent: Oct. 10, 1995

[54] POWER SURGE PROTECTOR

[75] Inventors: Colin D. Campbell, Groton; James H. Bleck, Chelmsford, both of Mass.

[73] Assignee: American Power Conversion Corporation, North Billerica, Mass.

[21] Appl. No.: 278,544

[22] Filed: Jul. 20, 1994

[51] Int. Cl.[6] ........ H02B 1/04

[52] U.S. Cl. ........ 361/643; 307/150; 361/736; 361/826; 361/828; 439/4; 439/501

[58] Field of Search ........ 174/38.48; 200/57 R; 307/112, 147, 150; 361/118, 600–601, 622, 643, 679, 683, 736, 752, 826–828; 439/4, 456–457, 501, 528, 535

[56] References Cited

U.S. PATENT DOCUMENTS

| | | | |
|---|---|---|---|
| 4,731,029 | 3/1988 | Lerner et al. | 439/4 |
| 4,944,694 | 7/1990 | Dorn | 439/501 |

*Primary Examiner*—Gregory D. Thompson
*Attorney, Agent, or Firm*—Banner & Allegretti, Ltd.

[57] ABSTRACT

A power director enables a user to apply power through one or more power outlets via one or more switches to a cluster of electrical devices, for example, the components of a desk top computer system. A typical computer system may have a CPU chassis, monitor, printer, CD-ROM and a document scanner each of which may have its own power line cord. The housing of the current power director has internal storage spaces or bays for coiling the excess portions of the power cords of the various computer components to eliminate the tangled mess associated with such systems. The electrical outlets are located in a component bay within the housing separate from but adjacent to the line cord storage bay to be accessible to the plugs of the line cords of the electrical devices sought to be controlled. The component bay contains a first printed circuit board (PCB) which carries the electrical outlets and a second PCB that contains an electrical surge protection circuit, a fault isolation circuit and the switches. The first and second PCBs are initially manufactured as a single PCB having a V-shaped groove which permits the single PCB to be broken into the first and second PCB parts, by hand, prior to installation in the component bay. The power director housing is able to support the weight of a 70 pound electrical device, such as a computer monitor, on its top surface.

27 Claims, 11 Drawing Sheets

POWER SURGE PROTECTOR

BACKGROUND OF THE INVENTION

This invention relates generally to method and apparatus for distributing electrical power to a plurality of electrical loads not all of which are located near convenient electrical power receptacles. More specifically, the present invention relates to a new and improved method and apparatus for a power director which has means for storing the excess length of a power cord associated with a particular electrically powered device.

Prior art power directors for desk top computer systems, for example, generally are packaged in thin, rectangular housings, sometime likened to take-out "pizza" boxes. These power directors can accommodate on their top surface the weight of at least a smaller computer monitor. They have a row of electrical outlet receptacles on a rear side and one or more electrical switches and status lamps or light emitting diodes ("LED" or "LEDs") on a front side. The row of electrical outlets are adapted for mating with the plugs at the ends of electrical power cords of electrically powered devices. Heretofore, no power director has included means for storing portions of the power cords of the different electrical devices used at a desk top along with a computer (associated devices) to manage the tangle of power cords coupled to the row of outlets on the back or rear sides of the pizza boxes.

Examples of the foregoing and related prior art power directors include: the Command Center, model SPF-4, of the Curtis Manufacturing Company of New Hampshire; the Power Trax 3000, of the EFI Electronics Corporation of Utah; The Master Piece Plus, model 62104, of Kensington Microwave, Ltd. of New York; the Command Console, model CCI 6–12, of the Tripp Lite company of Illinois; the Power Director Plus, model P15, of the Proxima company of California; and the Power Warren Plus, of the PC Concepts company of California. The Command Center product of the Curtis Manufacturing Company includes a cable organizer that is external to the housing of the power director.

SUMMARY

The novel and improved power director of the present invention employs method and apparatus that allow a user of an electronic system to control, separately, the application of alternating current (AC) power to its various components. The power director is particularly suited for use with desk top computer systems. Desk top systems often include separately powered components or peripherals such as monitors, printers, document scanners, and other devices not internal to the computer housing or otherwise powered via the computer housing.

With the embodiment disclosed herein, the power outlets of the power director are located inside its housing and the housing has a storage bay for coiling, portions of the cords mating with the internal power outlets.

There are four sub-bays, one each associated with an internal outlet. The individual bays are formed or defined by the space between pillars in the storage bay and the space between a pillar and a side wall of the power director housing. The pillars are topped with disks which are capable of holding coiled line cord in the storage bay when the lid to the storage bay is removed. The switches at the front of the housing control all but one of the outlets which is a live convenience outlet available to the user at all times.

The power director also has a component bay housing a single PCB broken into two parts prior to installation. One half of the PCB carries the on-off switches and the surge protection circuits. The other half of the PCB carries a supporting rack and four outlets.

DESCRIPTION OF THE DRAWINGS

Further objects and features of the present invention will be apparent from further reading of the specification in combination with the drawings which are as follows.

DETAILED DESCRIPTION

1. The Prior Art

Figure 1:
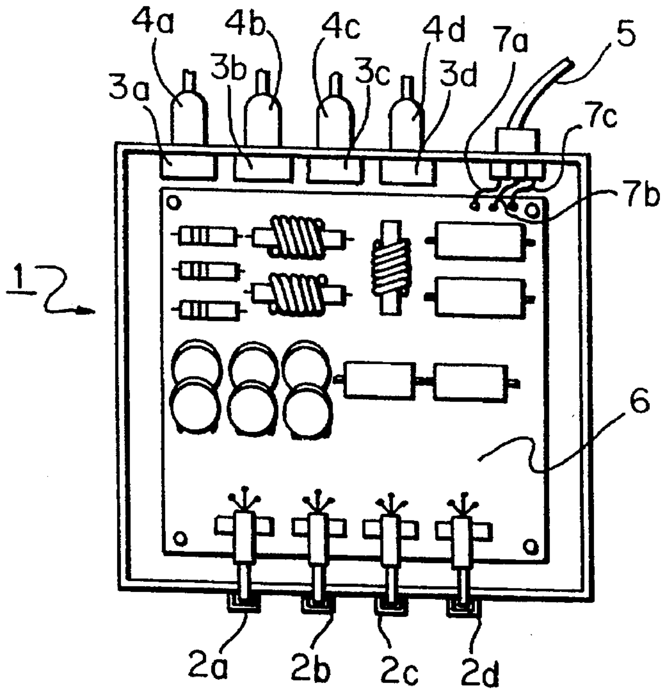
Fig. 1 PRIOR ART
FIG. 1 is a plan view of the top of a prior art power director with the top removed to show the PCB supporting the electrical components of a surge protector.

Power directors were developed to help computer users have better control over the task of switching "on" and switching "off" the various components of desk top computer systems, some of which were on the floor next to the desk, e.g. a central processing unit ("CPU") chassis, and others were on a nearby table, e.g. the printer. The "pizza box" type of power director 1 shown in FIG. 1 is representative. The power director has a row of four on-off power switches 2_a–d_, for example, on the front wall of its housing each of which apply power to outlet receptacles 3_a–d_, accessible at the rear wall of the power director. The line cords of four electrical devices are shown with their plugs 4_a–d_ mated with the receptacles 3_a–d_. The electrical plug at the end of a master power line cord 5, extending from the rear wall, is intended to be coupled to a 115 Volt 60 Hertz AC, power wall socket, not shown. When switch 2*a* is activated, i.e. it is turned on, AC electrical power is applied, for example, through receptacle 3*a* and plug 4*a* of a power line cord extending from a specific electrical device. In a typical desk top computer system, one of the switches 2*a–d* might be used to turn on and off the system CPU and other switches a video monitor, printer and a modem.

The top of power director 1 has been removed to show the printed circuit board (PCB) 6 contained within the housing, to which the master power cord is electrically coupled via hot, neutral and ground wires 7*a–c*. The computer monitor of a desk top computer system would typically sit on the top surface of the power director (illustrated in FIG. 2). The switches 2*a–d* are mounted on the PCB with an actuating electrical or mechanical apparatus extending through the front wall to permit its operation by a user. The PCB includes circuits for routing power from the master cord 5 to each of the switches 2*a–d* for the selective routing of AC power to one or more electrical devices via receptacle 3*a–d* and the plugs 4*a–d*. The PCB might also contain a surge protection circuit to prevent damage to the electrical devices plugged into the receptacles in the event a large surge of current or voltage appears on the power source, i.e. the wall socket. One such cause of a voltage and/or current surge includes a lightening strike of the building. The electrical components shown on the PCB 6 are representative of those that might be used in a surge protection system.

2. Uses of the New Power Director

Figure 2:
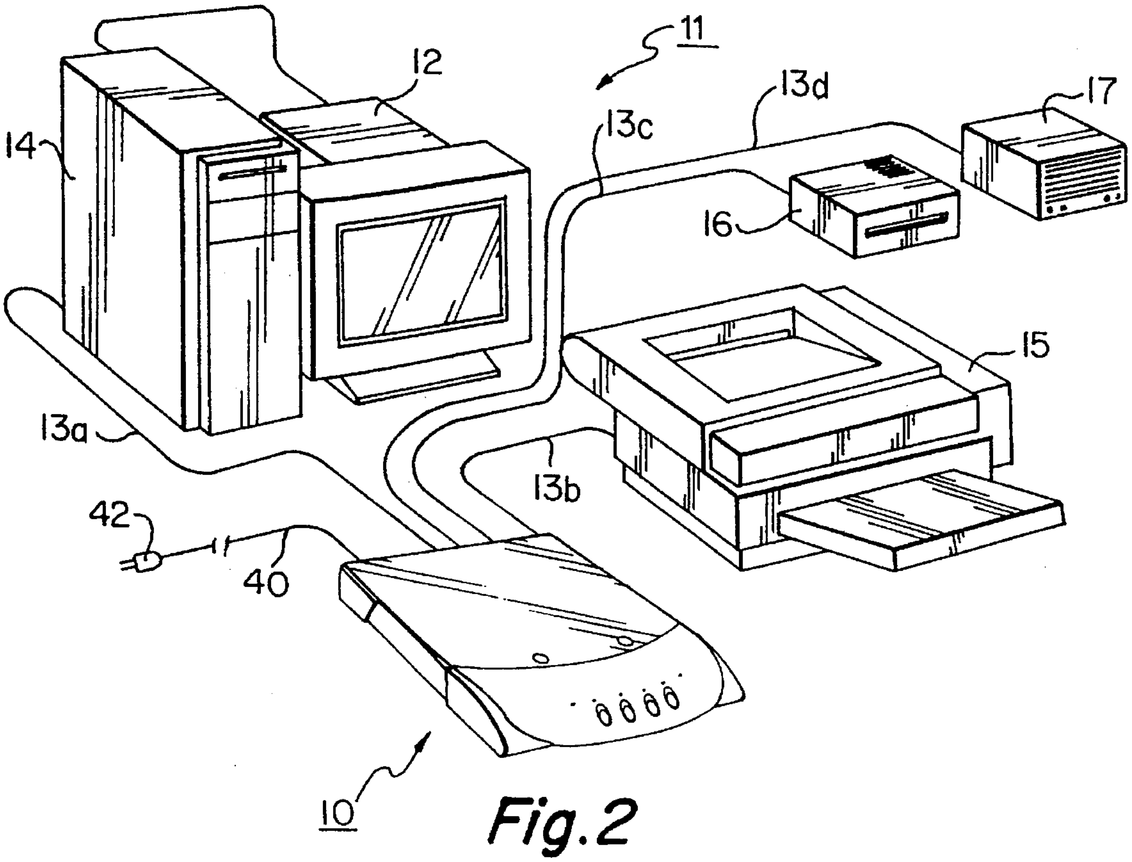
FIG. 2 is a perspective view of a computer system using the power director of the present invention.

FIG. 2 illustrates the present power director 10 in a computer system 11 with the monitor 12 intended to sit on its top surface. Power director 10 is described in detail in connection with reference to the remaining figures. Power director 10 differs from the prior art in several aspects including the location of outlet receptacles inside the housing of power director 10 and line cord storage spaces or bays within the housing for storing coiled portions of line cords 13 running from the power director to the various components (electrical devices) of the computer system. The orderly appearance of the line cords 13*a–d* extending from the rear of power director 10 to the individual devices 14–16, without excess line cord creating a tangled mess of cord on or near a desk top, represents an important, novel feature by power director 10.

The other devices of computer system 11 include the CPU 14, the printer 15, the CD-ROM 16 and the document scanner 17 which represent typical, external peripherals of desk top computer systems at this point in time. Modems and extra hard disk drives are frequently incorporated within the chassis of the CPU in currently marketed systems and may receive their electrical power from the CPU.

Power director 10 is also useful with other electronic and/or electrical systems such as a home entertainment center having a television monitor, audio speakers, VCRs, cable television control boxes, audio CD players, radio tuners and other such electrical devices or equipment, many of which have their own power line cords.

3. The Line Cord Housing Bay

Figure 3:
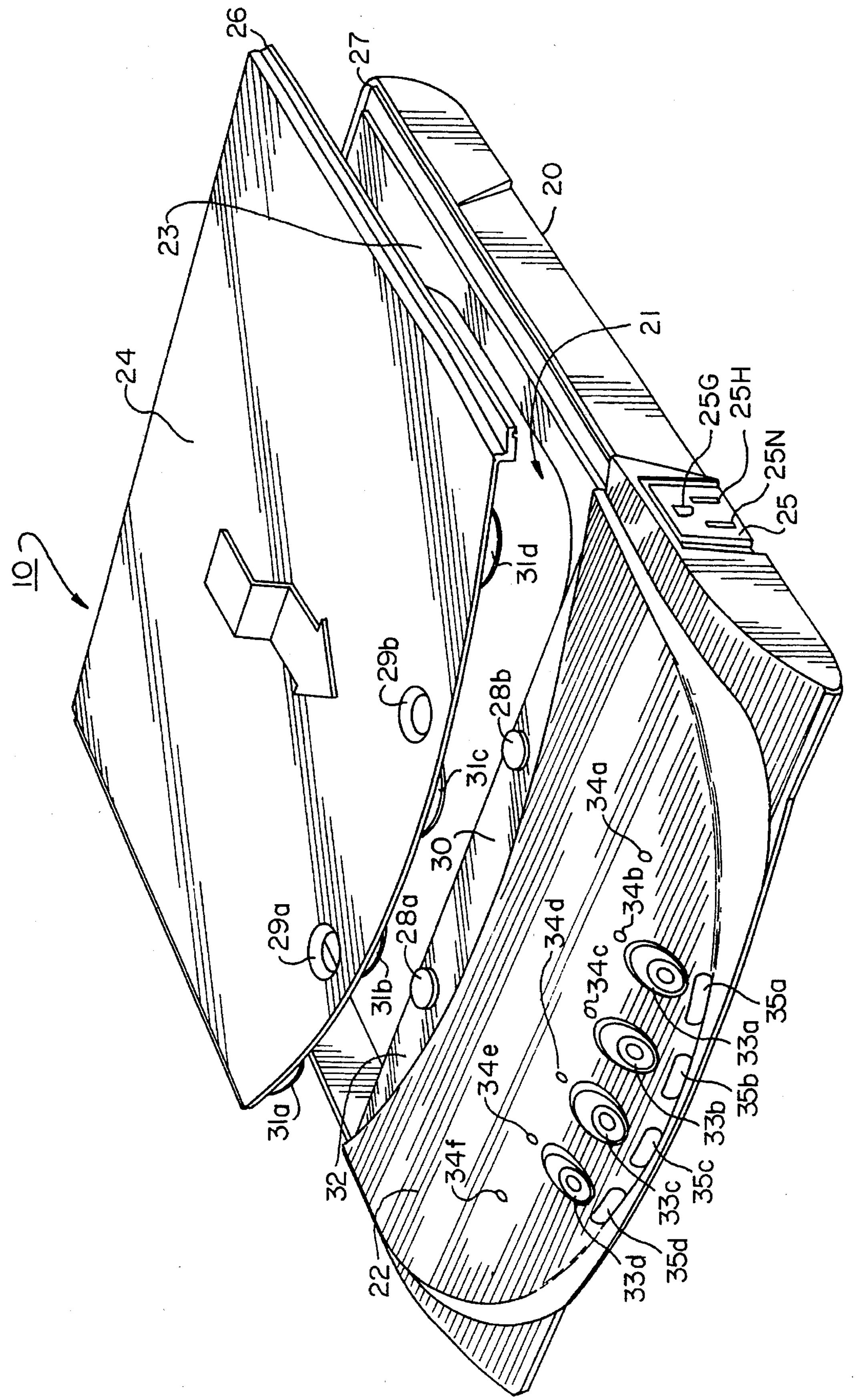
FIG. 3 is a perspective view of the power director with the top cover or lid in an exploded relationship to the housing of the power director.

FIG. 3 is a perspective view of power director 10 which represents the presently preferred embodiment. It includes the housing 20 and the line cord storage bay 21 for storing excess portion of line cords such as line cords 13*a–d* in FIG. 2. The power director includes two other bays: the outlet receptacle bay in space under the front, sloping hood 22 of the housing and the master power cord bay in the space under the guitar-shaped portion 23 of housing 20, partially visible in FIG. 3 (fully visible in FIGS. 4 and 5) under the lid 24. The lid is the top cover of housing 20 and the cord storage bay 21. The top surface of the lid is where a computer monitor, such as monitor 12 of FIG. 2, may sit.

As viewed from the front, a convenience outlet receptacle 25 is mounted in the right, front wall of the housing 20. The convenience outlet is mounted with the ground terminal 25G (a small circular shape) oriented upward and with the hot 25H (a small rectangular shape) and the neutral 25N (a large rectangular shape) terminals downward. This orientation of the convenience outlet, and all the other outlet receptacles discussed herein, was chosen to facilitate ease of electrically routing the ground and neutral terminals throughout the power director.

The lid 24 is adapted to fit securely on housing 20. To do so, it has a L-shaped latch mechanism on the underside of the lid which is discussed below in connection with FIG. 9. The lid has left and right channels 26 (only the right channel is shown) formed in its right and left sides that mate with left and right rails 27 (only the right rail is shown) on the right and left sides of the housing 20. To install the lid, the side channels 26 of the lid are mated with the side rails 27 of the housing at a position back from the latching buttons 28*a* and *b*. When the lid is installed, the latching buttons mate with the latching holes 29*a* and *b* formed in the lid. Simultaneously pressing down on the lid and sliding it forward along the rails over the latching buttons, locks the lid to the housing 20.

The buttons 28*a* and *b* are part of right and left, single plastic moldings formed from a continuous strip of plastic that comprise two separate leaf springs. Each leaf spring includes a horizontal S-shaped bend at the bottom of the housing, a vertical portion extending to the upper housing horizontal surface 30, curving into complementary shaped cut-outs in surface 30 and terminating at the buttons. As the front edge of the lid slides over the buttons, they bend downward and spring upward into the latching holes 29*a* and *b* when the buttons appear under the latching holes.

Four latching tabs 31*a–d* on the front edge of lid 24 mate with four complementary shaped openings in the wall 32 rising vertically from top surface 30 of the housing. The lead line of reference number 32 points to the top edge of the wall. The tabs and complementary openings in wall 32 are locked together by the upward force on the lid 24 by the slightly compressed leaf, springs that terminate at buttons 28*a* and *b*. As mentioned above, the lid is also secured to the housing by a L-shaped latching mechanism on its underside described in connection with FIGS. 8 and 9.

There are four, power control switch covers 33*a–d* that are mechanically connected to switches inside the outlet bay under hood 22. The switch covers are pushed to switch or route electrical power to equipment having line cord plugs connected to one or more outlet receptacles associated with the switches. This is explained in more detail below in connection with FIGS. 4–10 and 13.

There are six light pipes 34*a–f* mounted in holes extending through the hood 22. Four of the light pipes are positioned just above the four switch covers. Each light pipe emits light created by light emitting diodes (LEDs) located in the outlet bay under the hood 22. The LED associated with a switch cover is turned on when the associated switch is "on". Light pipe 34*f*, the right most light pipe, is lit by a LED in the outlet bay adjacent the other end of the light pipe, when the master power line cord (see reference number 40 in FIG. 4) of power director 10 is plugged into an electrical wall socket, for example. Light pipe 34*a* is lit by a LED in the outlet bay to indicate that the power director has been plugged into an outlet whose wiring is improper, e.g. has no ground or the hot and neutral wires are reversed. The fault light is a red color to prompt an inspection of the building's outlet wiring as improper and which could pose a hazard to the user, e.g. electrical shock. The color of the light emitted by the other LEDs associated with light pipes 33*b–e* is green to indicate that a switch associated with a switch cover 33*a–d,* is "on".

3.1 The Line Cord Sub-Bays

Figure 4:
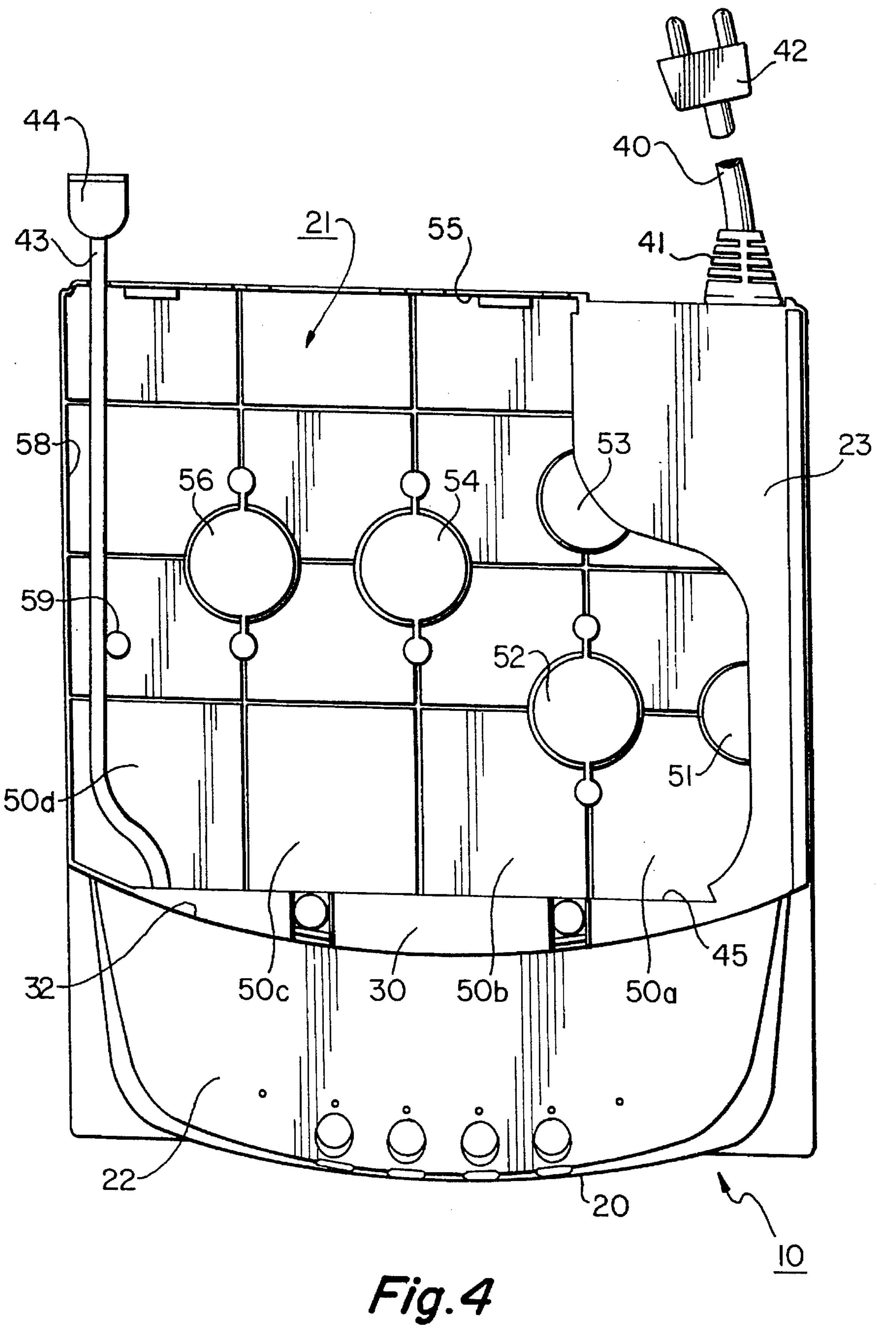
FIG. 4 is a plan view of the power director with the lid removed.

FIG. 4 is a plan view of power director 10 with the lid 24 removed to expose the shape of the line cord bay 21 and locate the master power line cord bay beneath the guitar-shaped surface 23 of the housing. The outlet receptacle bay includes the space beneath the hood 22. The master power line cord 40 is shown exiting the rear wall of the housing 20. The line cord begins at the strain relief cover 41 (FIG. 4) and is terminated with the line cord plug 42. On the left, rear end of the rear wall 55, the outlet cord 43 exits the housing and terminates at an outlet receptacle 44, hereafter referred to as the "flying outlet".

The flying outlet 44 is one of six outlets of power director 10. The first outlet to be discussed was the convenience outlet 25 on the right front side of the housing (shown in fig.3). The second through fifth outlets, yet to be specifically discussed (see reference numbers 71*a–d* in FIG. 5), are inside the outlet bay under hood 22 adjacent to the front wall 45 of the cord bay 21. These four outlets are accessible at wall 45 by the plugs (see reference numbers 72 *a–d* in FIG. 5) of the line cords of various electrical devices.

The flying outlet 43 is particularly useful for mating with a power block plug. A power block plug is an AC adapter familiar to many as the rectangular block having the pin and spades of a an electrical line cord plug for mating with an ordinary wall outlet receptacle. A power block converts the 115 Volt AC power source to a direct current DC power source or to a lower AC voltage. Examples of power blocks are those used on the line cords of portable ink jet printers, certain calculators, modems, telephone answering machines and household portable telephones. The flying outlet is useful because the flying outlet's cord 43 is flexible and extends outside the housing where a power block connected to it can be set on the desk top, for example.

The line cord bay 21 provides spaces for coiling excess line cord resulting from the line cord being greater in length than required to reach from the electrical device to which it emanates to a receptacle at wall 45 in the cord bay 21. Cord bay 21 is specifically adapted to accommodate coiling four line cords within four separate line cord spaces or sub-bays within bay 21. The four cord storage sub-bays are represented by reference numbers 50*a–b*. The bays are three dimensional. The horizontal and vertical dimensions of a sub-bay floor lie in the plane of FIG. 4. The third dimension of the sub-bays is the altitude above the floor, bounded by the lid when it is in place.

Line cord sub-bay 50*a* includes, roughly, the irregularly space above the floor area bounded as viewed in FIG. 4 by: the left most boundary of the floor area under partial disk 51; the right most boundary of the floor area under the left most full disk 52 adjacent partial disk 51; the right most boundary of the floor area under the partial disk 53; the portion of the front wall 45 above and to the left of the right most boundary of the floor area under full disk 52; and the wall of the guitar-shaped portion of the housing 23 (under which lies the master line cord bay) extending from the second intersect of the wall with partial disk 53 to front wall 45. The sub-bay 50*b* includes, roughly, the space above the nearly rectangular floor area bounded by the front and rear walls 45 and 55 above and below, respectively, the left most boundary of the floor area under full disk 52 and the right most boundary of the floor area under the center, or left full disk 54. Similarly, sub-bay 50*c* is, roughly, the space above the nearly rectangular floor area bounded by the front and rear walls 45 and 55 above and below, respectively, the left most boundary of the floor area under full disk 54 and the right most boundary of the floor area under the adjacent, full disk 56. Sub-bay 50*d,* the right most bay, is, roughly, the space above the nearly rectangular floor area bounded by front and rear walls 45 and 55 above and below, respectively, the left most boundary of the floor area under the right most, full disk 56 and side wall 58 of housing 20 and the pillar 59, adjacent the side wall 58.

Figure 5:
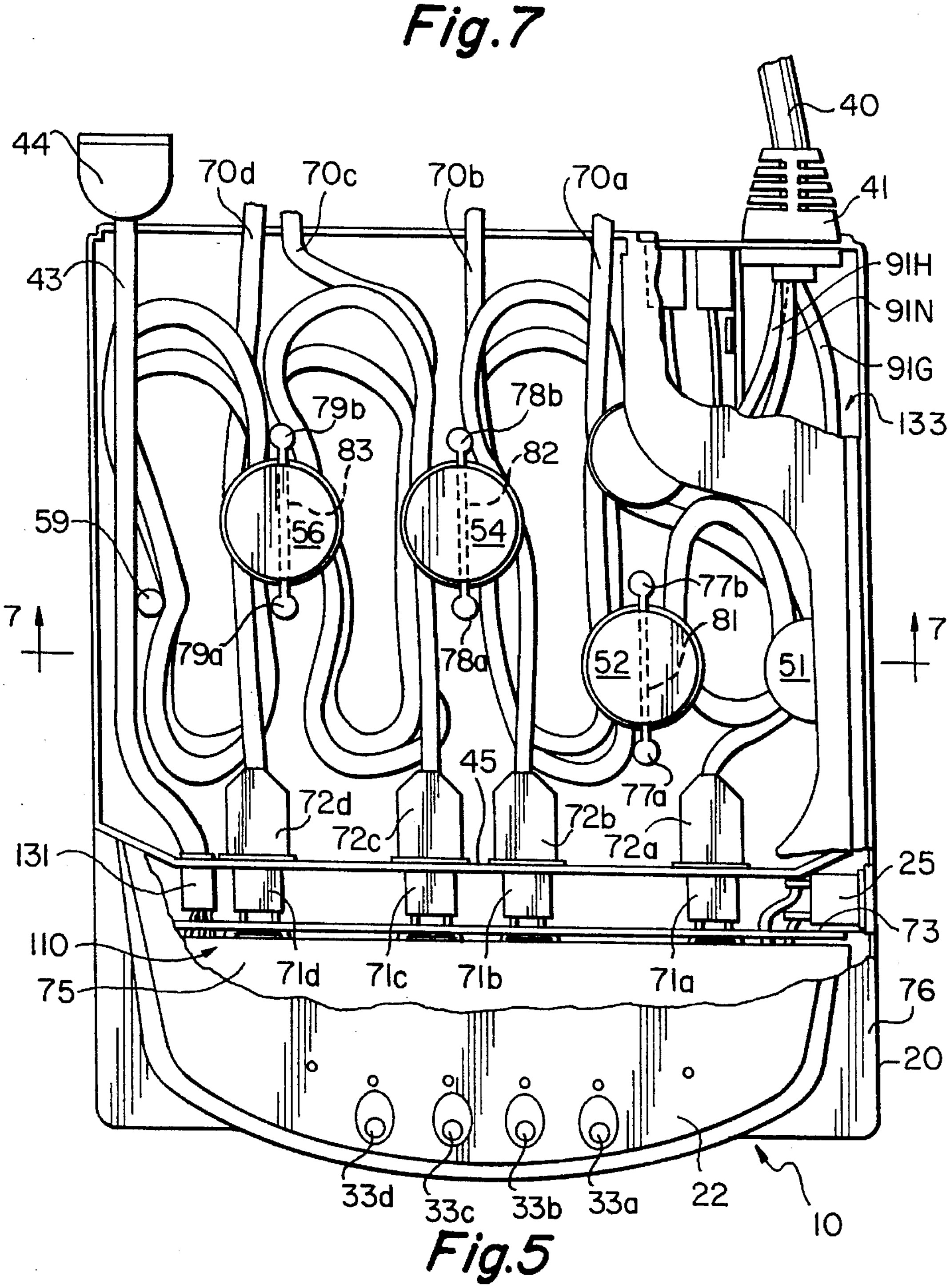
FIG. 5 is a plan view of the power director of FIG. 4 with a portion of the housing cut away to reveal the multiple outlets, the first PCB on which the outlets are mounted, a second PCB on which the surge protector circuit is mounted and four (4) power cords of four (4) separate electrical devices coiled in four (4) line cord sub-bays of the power director.

Turning to FIG. 5, excess portions of four line cords 70*a–d* are shown coiled in the above described sub-bays 50*a–d*. FIG. 5 is similar to the plan view of the power director of FIG. 4 with segments of hood 22 and guitar-shaped portion of the housing 23 cut away to expose outlet receptacles 71*a–d,* among other things. The cut away section under hood 22 reveals the outlet receptacles 71*a–d* mated with the plugs 72*a–d* of the line four cords. The outlets 71*a–d* are shown mounted on first PCB 73 as is the strain relief block 74 of the flying outlet cord 43. The hot, neutral and ground wires of the flying outlet cord are electrically coupled to like named terminals on PCB 73. At the opposite end of PCB 73, the "hot" wire of the convenience outlet 25 is coupled to a hot terminal on the second PCB 75. The neutral and ground wires of the convenience outlet are coupled to like named terminals on first PCB 73. The convenience outlet 25, first discussed in connection with FIG. 3, is shown slide-fit mounted in a notch in the left wall 76 (as viewed in FIG. 5) of housing 20. The second PCB also carries the switches coupled to the switch covers 33*a–d,* the electrical components of a surge protection circuit and the electrical components of a fault detection circuit which are discussed below in connection with FIGS. 11 and 12 and 13.

The line cord storage bay 21 also includes three pillar pairs 77*a* and *b,* 78*a* and *b* and 79*a* and *b.* Walls 81, 82 and 83 extend between, and are part of each pillar pair as indicated by the dashed lines through the full disks 52, 54 and 56 representing the width of the walls. (The bottom surfaces of a portion of the walls 81–83 are shown in solid lines in FIG. 8, 11 and 12) The walls 81–83 support disks 52, 54 and 56 at an altitude above the floor of the housing to contact the under side of the lid 24, when installed, (see FIG. 3) and a latching member connected to the lid, discussed in connection with FIG. 8. The pillars and walls provide the structural support, along with the partial disks and the full disks, among other surfaces, for bearing the weight of the lid and any computer monitor or other electrical device that is placed on the top surface of the lid 24. The housing 20 can support a weight of at least 70 pounds placed on the lid without experiencing mechanical distortion.

The line cords 70*a–d* are folded into shapes akin to the folds of yarn in a skein or hank of yarn. The term "coiled" is intended to include the illustrated folded cord, a circular or near circular winding of the line cord, a sine wave like folding of the cord or any irregular winding of the cord not only within the sub-bays 50*a–d* but also in an irregular winding pattern of a line cord across and among different sub-bays.

Figure 6:
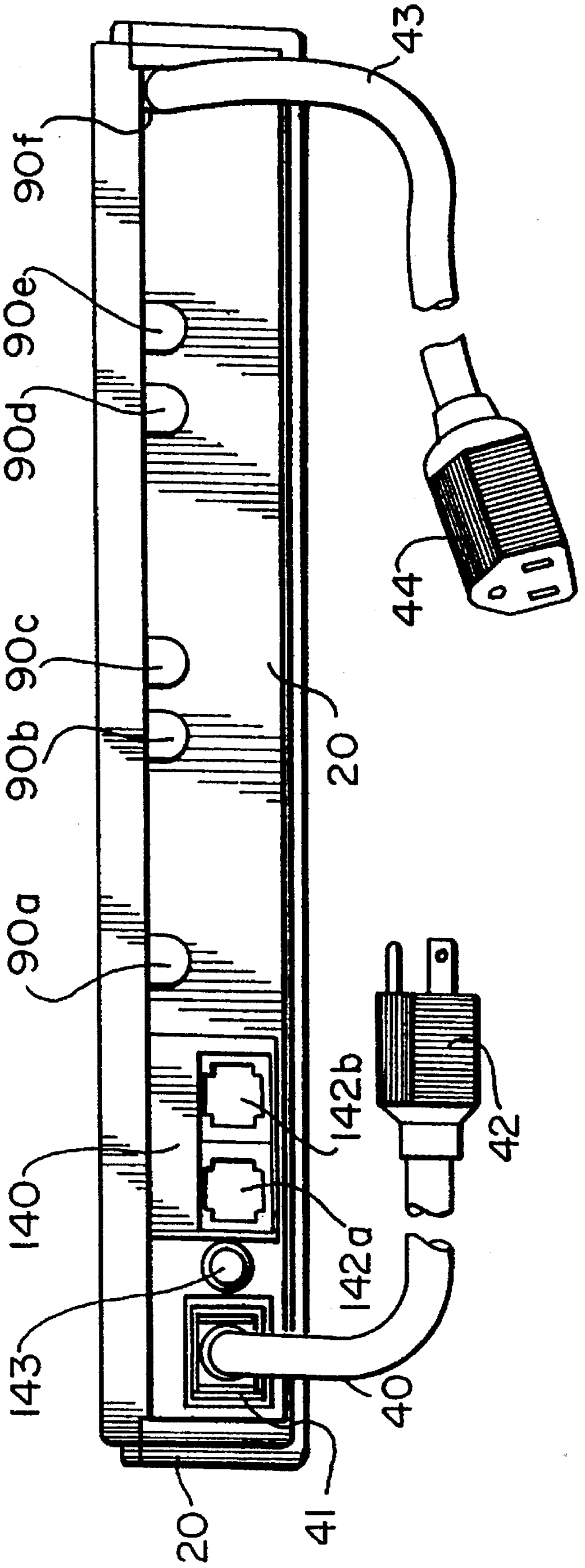
FIG. 6 is a rear elevation view of the power director.

The disclosed method of coiling the line cord to take up excess portions is the presently preferred method. Referring to FIG. 6, the preferred embodiment permits a line cord, for example line cord 70*a*, to exit the housing 20 through the left most cut-out 90 a in the rear wall 55 located generally in front to rear alignment with outlet receptacle 71*a* and switch cover 33*a*. The power switch to which the switch cover 33*a* is connected, controls power to outlet 71*a*, thereby making the electrical device connected to outlet 71*a* logically associated with switch cover 33*a*. An electrical device coupled via its line cord plug 72*b* passing through cut-out exit 90*b* to outlet 71*b* is associated with the switch connected to cover 33*a* because that switch also controls outlet receptacle 71*b*. Electrical devices whose line cords pass through exits 90*c* and *d* in rear wall 55 of the housing and whose plugs 72*c* and *d* are mated with outlets 71*c* and *d* are logically associated, respectively, with switch covers 33*c* and *d*. An electrical device coupled via the plug of its line cord to the flying outlet 44 is associated with the switch connected to switch cover 33*d* because the flying outlet cord 43 exits the housing through cut-out exit 90*f*.

Figure 7:
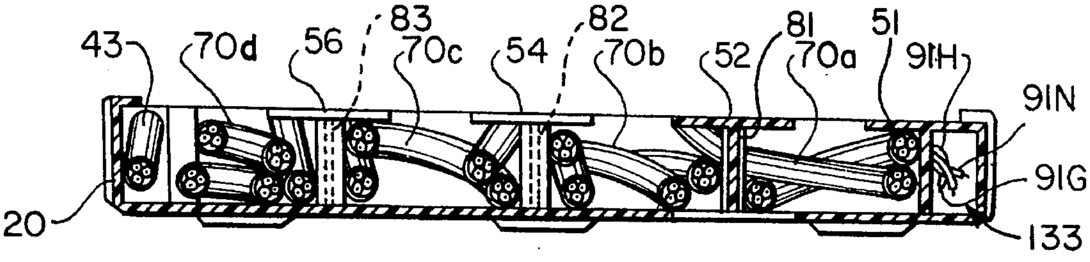
FIG. 7 is a cross-section view of FIG. 4 taken along the section line 7—7 showing coiled line cords restrained under the partial and full disks located in the storage bay.

FIG. 7, is a cross-section of FIG. 5 taken along section line 7—7. It illustrates short sections of the coiled power line cords 70*a*–*d* restrained, inter alia, by the bottom surfaces of the disks 52, 54 and 56 and, although not shown, by the bottom surfaces of partial disks 51 and 53, within the four, cord sub-bays 50*a*–*d*. The lid 24 keeps the coiled cords in place when it is installed. While the lid is removed, the line cords can be coiled in a sub-bay without unraveling or uncoiling by the undersides of the full and partial disks as represented by the cross-sections of partial disk 53 and the full disk 52.

Segments of the hot, neutral and ground wires 91H, N and G of the master line cord 40 are shown in FIGS. 5 and 7. The three wires 91H, N and G of the master line cord extend from the back wall 55 through the master power cord line bay under the guitar-shaped portion 23 of housing 20 to the second PCB 75 where the three wires are coupled to 91 H, N and G terminals on PCB 75.

Figure 8:
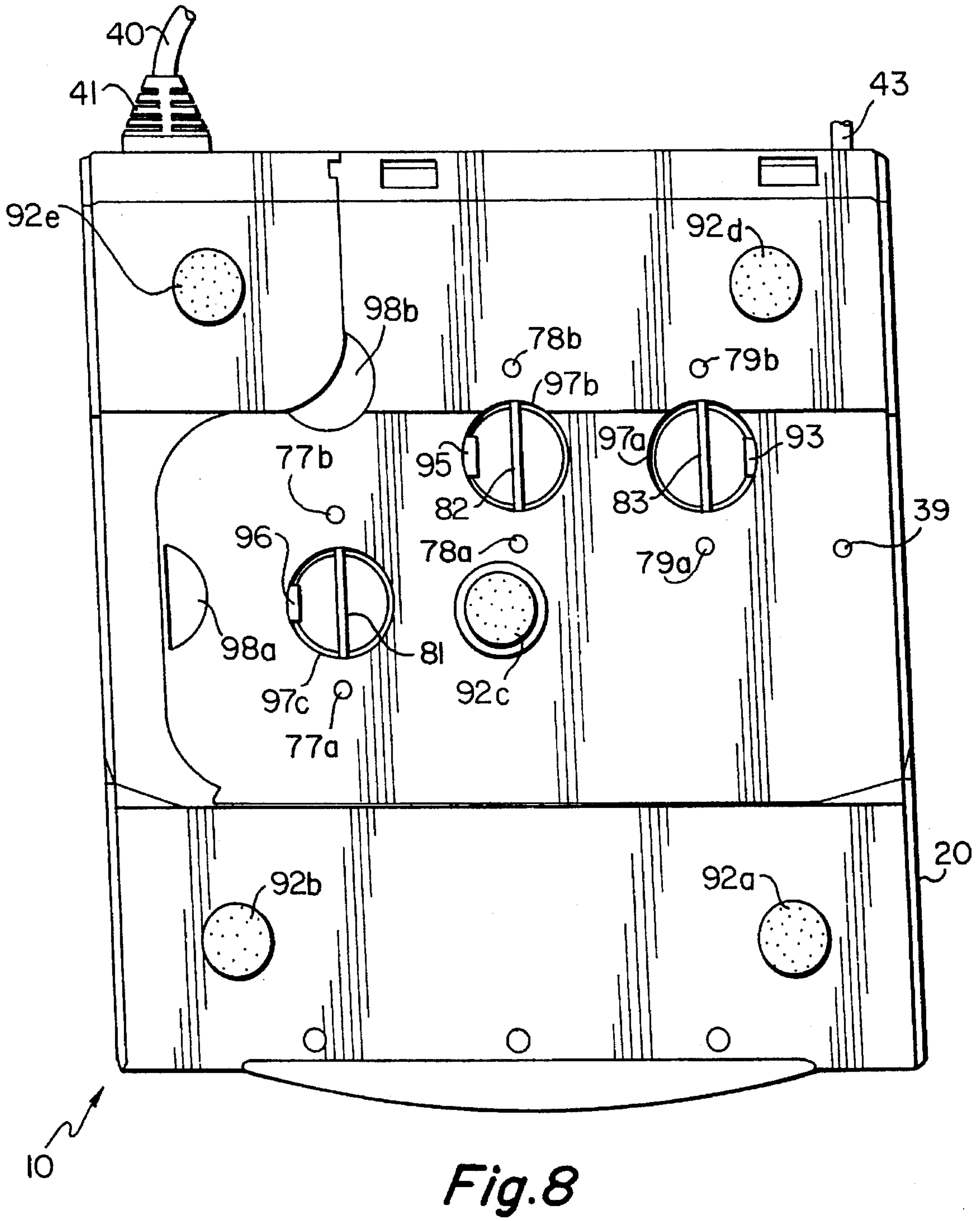
FIG. 8 is a plan view of the bottom of the power director.
Figure 9:
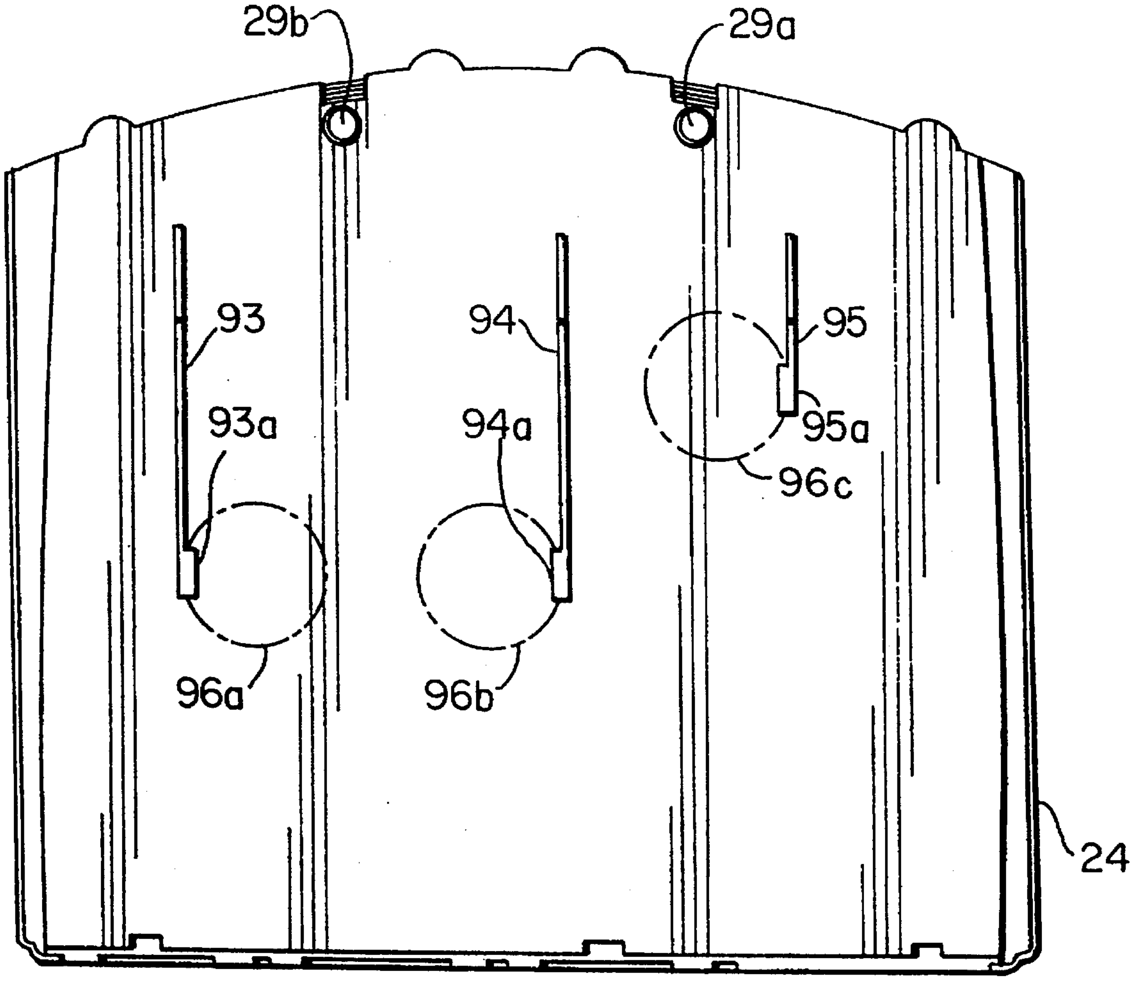
FIG. 9 is plan view of the inside surface of the lid of the power director.

FIGS. 8 and 9, among other features, illustrate how the lid 24 is latched to the housing 20. FIG. 8 is a bottom view of the power director 10 which shows the five anti-skid pads 92*a*–*e*. The skid-pads resist sliding of the power director across a desk top under the weight of the master power line cord 40 and up to five other line cords coupled to the power director, including a power block coupled to the flying outlet. The empty weight of the power director 10, including its eight foot power cord, is about five pounds. The weight of the power director along with the weight of coiled portions of line cords inside the cord storage bay 21 enables the skid-pads to keep the power director from sliding due to the weight of the line cords and any incidental pushing of the director in the course of working around it on the desk top. Of course, if there is a forty pound monitor or other electrical device sitting on the power director, the skid pads are able to resist sliding in response to substantially greater forces than the cumulative weight of the master power cord, five line cords and a power block.

FIG. 8 also shows portions of walls 81, 82 and 83 that extend between pillar pairs 77*a* and *b*, 78*a* and *b* and 79*a* and *b* and support the full disks 52, 54 and 56, the lid 24 and any electrical device sitting on the lid. The walls are visible through circular cut-outs 97*a*, *b* and *c*, located concentrically beneath the disks 52, 54 and 56. Similarly, the bottom of the housing 20 includes partial, circular cut outs that are located concentrically beneath the partial disks 51 and 53. The pillars are cylinders having closed tops and open bottoms which are seen as small circles in FIG. 8.

FIG. 9 is a plan view of the underside of the lid 24. The underside of the lid includes two long rails 93 and 94 and a short rail 95, molded as part of the lid, each of which have a latch or projection 93*a*, 94*a* and 95*a*, respectively, located at the ends of the rails. The projection 93*a* extends to the right (as viewed in FIG. 9) and the projections 94*a* and 95*a* extend to the left. The projections are spaced from the lid a distance slightly greater than the thickness of the full disks 52, 54 and 56 (shown in FIGS. 4 and 5) and fit against the bottom surfaces of the disks to lock or latch the lid to the housing 20. The dashed circles 96*a*, *b* and *c* in FIG. 9 represent the disks 52, 54 and 56 to illustrate how the projections mate with the disks. The latches or projection 96*a*, *b* and *c* assume the positions shown relative to the full disks when buttons 28*a* and *b* are mated with holes 29*a* and *b* in lid 24 (see FIG. 3).

4. The Component Bay

Figure 10:
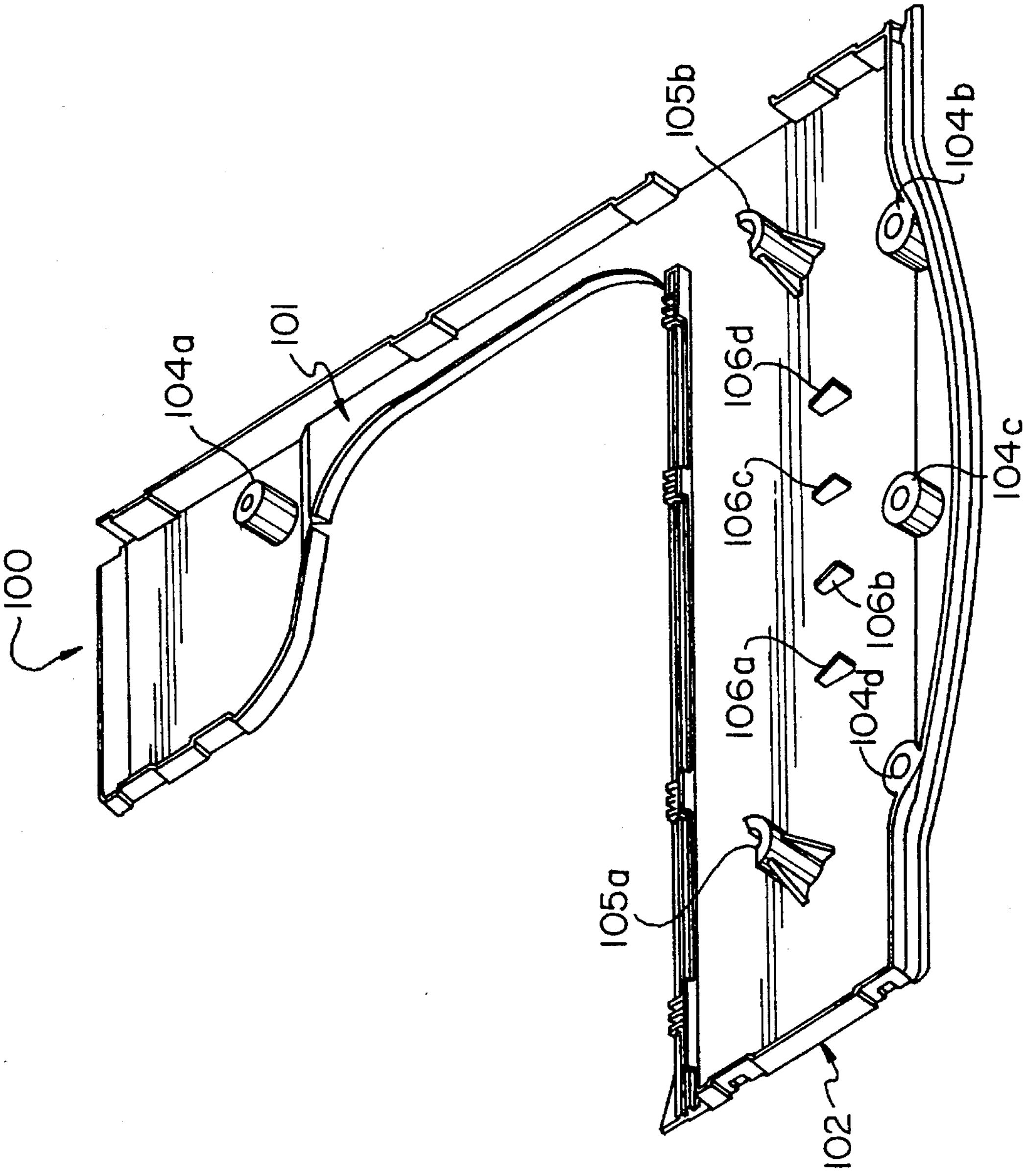
FIG. 10 is a perspective of the bottom cover of the power director.
Figure 11:
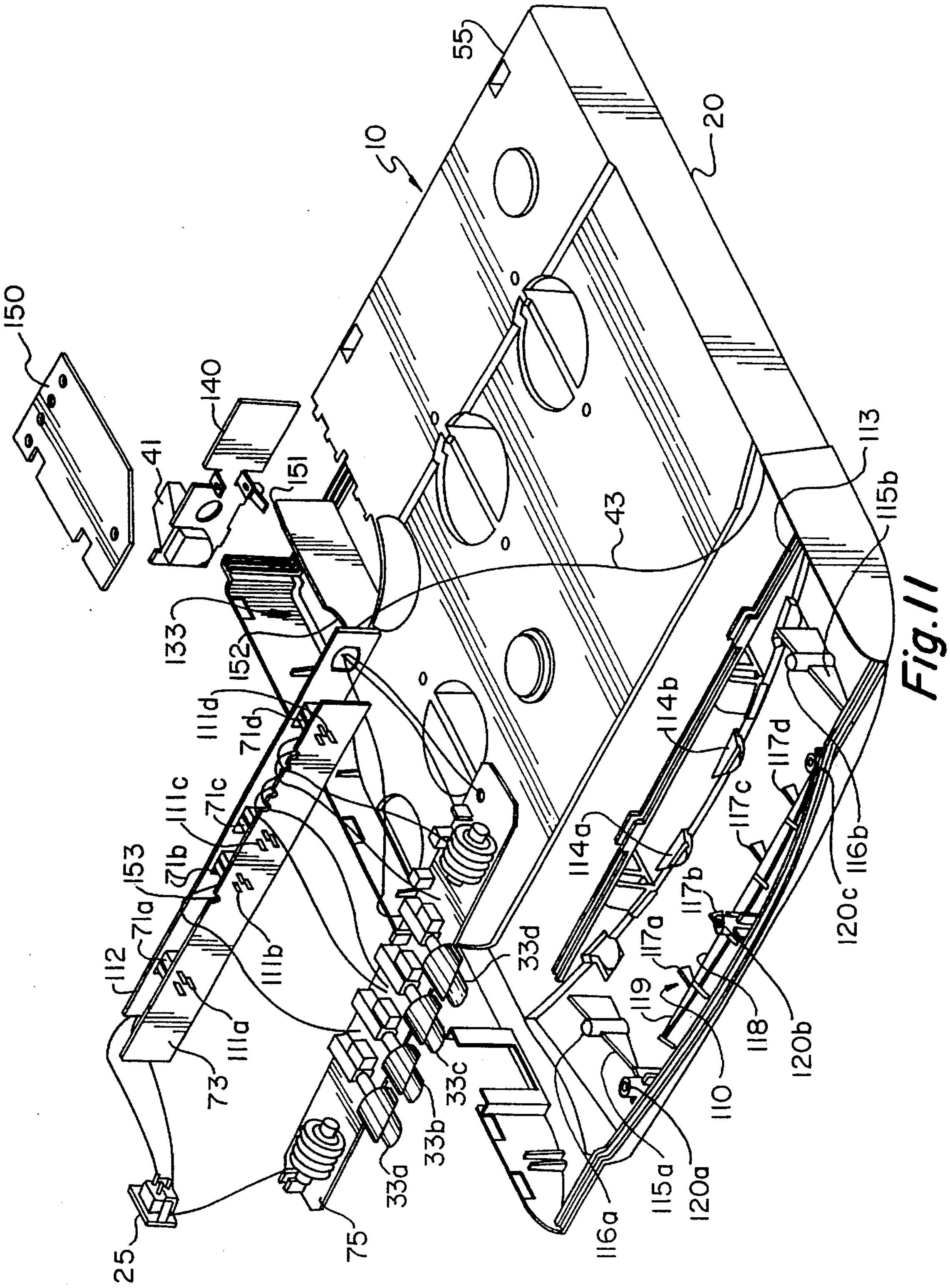
FIG. 11 is a perspective view of the power director in an upside down orientation with the bottom cover removed showing the first and second PCBs in an exploded relationship to the power director.
Figure 12:
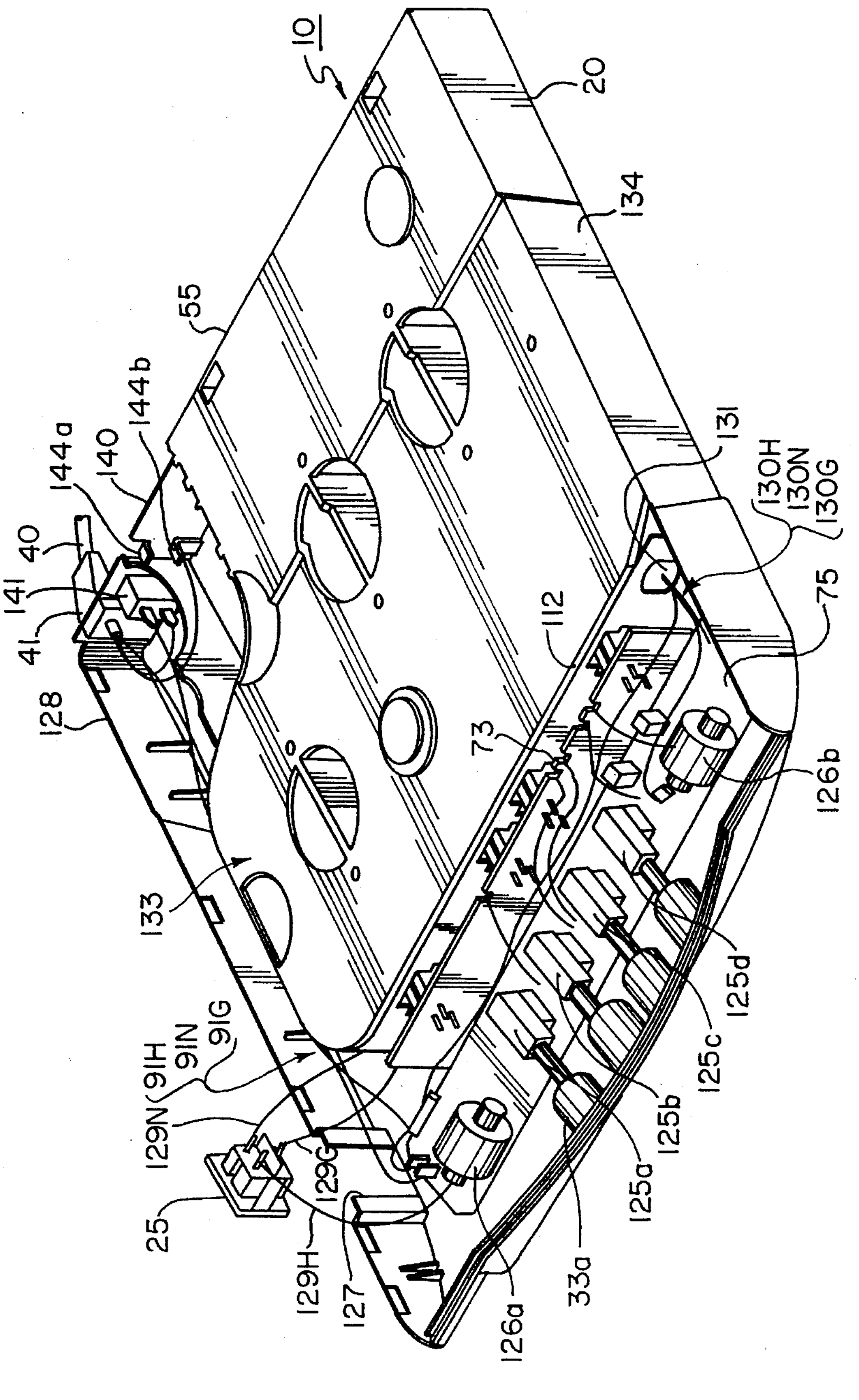
FIG. 12 is a perspective view of the power director in an upside down orientation with the first and second PCBs installed in the component bay of the power director.

The following discussion is directed to FIGS. 10, 11 and 12. FIG. 10 is a perspective view of the bottom cover 100 of the power director housing 20 shown with the inside (or underside) of the cover facing upward. The cover includes a guitar-shaped portion 101 that covers the bottom of the master line cord bay and generally conforms to the shape of the guitar-shaped portion 23 of the housing shown in FIGS. 4 and 5. The master line cord bay lies between the guitar-shaped portions 23 and 101, respectively, of the housing and bottom cover. Cover 100 also includes a generally rectangular portion 102 that covers the component bay 110 described as lying under the hood 22 of the housing. The component bay 110 is the space between the portion 102 of the bottom cover and the underside of the hood 22.

The bottom cover includes four, generally cylindrical posts 104*a*–*d* that are guides for four screws that mate with threaded screw holes formed in complementary cylinders extending from the top, inside surfaces of the housing toward the cylindrical guides 104*a*–*d*.

The bottom cover also has two partial cylindrical posts 105*a* and *b* that align the second PCB 75 at two locations on the PCB having circular through-holes for guide posts 116*a* and *b* to extend through the PCB mate with posts 105*a* and *b* to properly locate the second PCB in the component bay and to hold or lock it in place. The guide posts 116*a* and *b* are shown in FIG. 11.

The bottom cover also includes four sloped, wedges 106*a*–*d* that align against the electrical switches on the second PCB to hold or lock them, and the PCB in place when the bottom cover is installed.

Turning to FIG. 11, the component bay 110 is the cavity lying between the portion 102 of the bottom cover and the hood 22 of the housing. The major components of the power director housed in this bay are the two PCBs 73 and 75, first discussed in connection with FIG. 4. The two PCBs 73 and 75 are created from a single, parent PCB that has two sections separated by a V-shaped grooves or wedge cut into the PCB during its manufacture. All the circuitry, the components and wires (including hot, neutral and ground wires shown and described) are mounted on or connected to the parent PCB. Just prior to installation into the component bay 110, the parent PCB is broken by hand along the V-shaped grooves into the two separate parts: the first PCB 73 and the second PCB 75.

The first PCB 73 has four receptable outlets 71*a*–*d* accessible from cord bay 21 mounted on it. The hot, neutral and ground pins of the four outlets are soldered into through-holes in PCB 73. A metal, flat plate or frame 112 includes four, generally rectangular cut-outs, generally matching the cross-section of the receptable outlets 71*a–b,* into which the main body of each receptable is inserted. The cut-outs are collars for holding the receptable outlets. Face plates (not shown in FIG. 11) are mounted on the main bodies of the receptable while they are inserted into the cut-outs thereby locking the outlets 71*a–d* to the frame. A metal bar (not shown) that is part of frame 112, extends from its left end and is soldered into a through-hole in PCB 73. The resultant assembly, including the metal frame 112, four receptables and metal bar is structurally rigid. The frame 112 mates with the linear slot 113 which extends across a substantial portion of the component bay. The PCB 73 fits against the vertical alignment surfaces 114*a* and *b* when the frame is mated with slot 113. The linear slot 113 and the vertical surfaces 114*a* and *b* insure proper alignment of PCB 73 in component bay 110.

The second PCB 75, when installed, rests on the left and right (as viewed in FIG. 11) ramps 115*a* and b with the left and right posts 116*a* and b extending through left and right holes cut into PCB 75 (not shown to keep the drawing simple and thereby more understandable but also described in connection with FIG. 10). The posts 116*a* and *b* establish proper alignment of the PCB within component bay 110. The front bottom surface of PCB 75 (as viewed in FIG. 11) rests on four pads 117*a–d* in the component bay when the PCB is mated with the posts 116*a* and *b.* The forward ends of the pads provide alignment for the light pipe assembly 118 which include a tie bar 119 that is heat tacked to the underside of hood 22. The Tie bar supports the four light pipes 34*a–d* extending through the holes in the hood 22 as illustrated in FIG. 3.

The three, threaded cylinders 120*a–c,* also located in the component bay, are molded to the underside of hood 22. Each threaded cylinder mates with a screw inserted into one of the three cylinders 104*b, c, d* and *e* shown in FIG. 10. A fourth threaded screw cylinder is located in the master line cord bay near the rear wall that mates with a screw inserted into the cylinder 104*a* shown in FIG. 10. The fourth threaded cylinder is not shown in FIG. 11 to simplify the figure and thereby make it more clear. The fourth threaded cylinder is attached to the underside of the guitar-shaped portion 23 of the housing at a location opposite the cylinder 104*a* which is attached to the inside surface of the bottom cover 100.

FIG. 12 shows the component bay 110 with both PCB 73 and 75 mounted in the bay. The switch covers 33*a–d,* as explained in connection with FIG. 3, extend through holes in hood 22 where they are accessible to a user. The switch covers are coupled to the four electrical switches 125*a–d* mounted inside the bay on PCB 75. The necks of the switches to which the switch covers are connected are spring biased plungers extending from a rectangular-shaped switch housing.

The components 126*a* and *b* on PCB 75 are electrical windings around an iron core (or other magnetic flux conductor) comprising an electrical inductor or choke. The coils are part of the surge protection circuit on PCB and are wired in series with the hot ("H") and neutral ("N") wires of the master power cord 40. The switches 125*a–d* and the coils 126*a* and b are the largest components of the circuitry on PCB 75. Other components of the surge protection circuit and the fault isolation circuit include metal oxide varistors ("MOV"s), resistors, capacitors, diodes, fuses and the like. None of these are shown to simplify and thereby clarify the drawing.

FIG. 12 also illustrates the convenience outlet 25 in an exploded position relative to the cut-out 127 in side wall 128 of housing 20. The convenience outlet slide fits into the cut-out 127 and is locked in place when the bottom cover 100 is installed and the four screws referred to are mated with the threaded cylinders discussed above.

FIG. 12 further shows the neutral and ground wires 129H, N and G coupled between convenience outlet 25 and like labeled terminals on PCB 73 and the hot wire 129H is coupled between the convenience outlet and a like labeled terminal on PCB 75 generally at the locations shown. Similarly, the hot, neutral and ground wires 130 H, G and N of the flying outlet cord 43 extend from terminals on PCB 75 to the strain relief block 131 mounted in a cut-out in frame 112.

The first PCB 73 is not as long as second PCB 75. The left end of PCB 73 (as viewed in FIG. 12) is offset from the end of PCB 75 to accommodate the installation of the convenience outlet 25 into the cut-out 127 and the passage of the master line cord wires (See FIG. 5) 91H, N and G, through the master line cord bay 133. Wires 91H, N and G are terminated on PCB 75 at one end and extend out to strain relief block 41, to which the sheath of line cord 40 is anchored.

The right side of PCB 73 (as viewed in FIG. 12) is also offset from the end of PCB 75 to facilitate the passage of the flying outlet wires 130H, N and G from PCB 75 to the strain relief block 131 for the flying outlet cord 43. The flat metal frame 112 extends further to the right (as viewed in FIG. 12) than the right end of PCB 73 to position the strain relief block 131 next to the side wall 134 and to make room for wires 130 H, N and G. The flying outlet cord 43 is fed through the space between the bottom of the housing and the hood when the PCB 73 assembly is set into slot 113.

5. The Master Power Line Cord Bay

The master line cord bay 133 is visible in both FIGS. 11 and 12. The master line cord wires 91H, N and G were described as starting at PCB 75 in the component bay 110 and passing through the neck portion of master line cord bay 133 to the cord strain relief block 41. The relief block is slip mounted in a cut-out in the metal, plate 140. Plate 140 is itself slip mounted in grooves in the rear wall 55 of the housing. Plate 140 also contains a circular cut-out for supporting the reset button 143 of a circuit breaker 141 and cut-outs for two RJ-45 telephone jacks 142*a* and *b* (shown in FIG.. 6).

The circuit breaker 141 is wired in series with the hot 91H wire of the master power cord. Wire 91H, coupled to strain relief block 41, is in two segments, one coupled to a first terminal on the circuit breaker and the other segment coupled to a second terminal on the circuit breaker, as shown. Similarly, the ground wire 91G of the master power cord coupled to the strain relief block 41 is in two segments, one coupled to bracket 144*a* on metal plate 140 and the other coupled to bracket 144*b* on plate 140. The circuit breaker reset button 143 (FIG. 6) fits through the circular cut-out in plate 140 to permit the device to be reset from the outside of the power director. (see FIG. 6)

Returning to FIG. 11, a third PCB 150 and flat plate 140 are shown in exploded relationship to the rear wall 55 of the housing. There is also a divider wall 151 in the box region of the guitar-shaped master line cord bay 133. PCB 150 is mounted on a threaded cylinder not shown located inside the bay 133 on the right side of wall 151. PCB 150 carries a telephone network protection circuit (not shown to simplify the drawing) capable of protecting the data and/or components, e.g. a modem, of a computer system or communication network. The RJ-45 phone jacks 142*a* and b fit into cut-outs in the plate 140 (see FIG. 6) and the telephone surge protection circuit is electrically coupled between the two jacks.

The divider wall 151 separates PCB 150 and its telephone circuits from the master line cord wires 91H, N and G. The wall includes a notch 152 to permit the two segments of the ground wire 91G to pass into and out of the bay without being crimped on the top of wall 151 when the bottom cover is fastened to the housing. Similarly, there are five notches (notch 153 being typical) in the top edge (as viewed in FIGS. 11 and 12) of PCB 73 to accommodate five wires extending from PCB 73 to PCB 75 to avoid being crimped on the edge of PCB 73 when the bottom cover 100 is fastened to the housing. The five wires nestled in the notches 153 consist of three hot (H) wires, one neutral (N) wire and one (G) ground wire. These wires are coupled to the master power cord wires 91H, N and G via circuitry on PCB 75 and to like terminals on pins 111*a–d* of the four outlets 71*a–d* via circuits on PCB 73.

6. The Switch and Outlet Wiring

Figure 13:
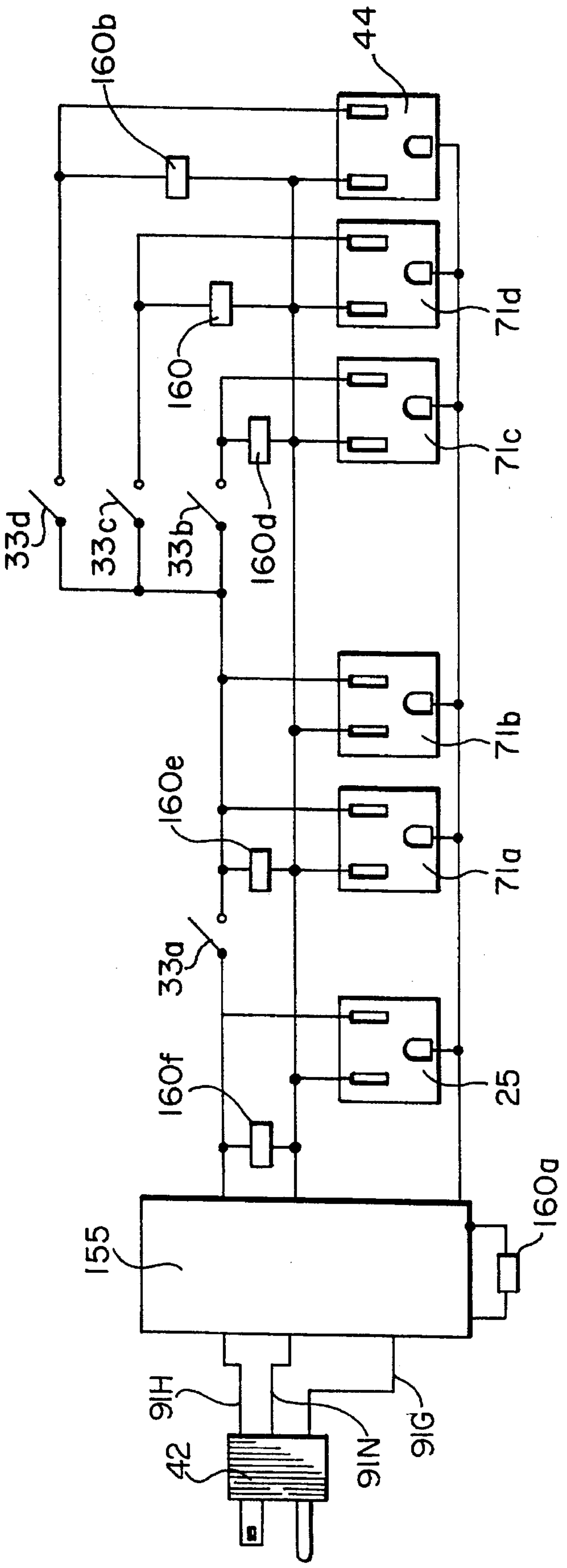
FIG. 13 is a schematic electrical diagram of the power director.

FIG. 13 is a schematic diagram of the circuits containing the switches 125*a–d* shown in FIGS. 11 and 12. These switches are actuated by a user pressing the switch covers 33*a–d* shown in FIGS. 3, 4, 5, 11 and 12. The surge protection and fault indicator circuits are represented by box 155 coupled in series with the hot, neutral and ground wires 91H, N and G of the master line cord, and plug 42 and the six outlet receptacles: the convenience outlet 25; the four outlets 71*a–d* mounted to the first PCB 73 and the flying out 44. The arms of the switches schematically represent the four switch covers 33*a–d* and associated switches 125*a–d*. The surge protection circuit and the fault indicator circuit are coupled to every electrical device having its line cord plug mated with one of the six outlets available on the power director.

7. Conclusion

The foregoing description has been limited to a specific embodiment of the invention. Additional advantages and modifications will be apparent to those skilled in the art. The invention is, therefore, not limited to the specific details, representative apparatus, and illustrative example shown and described in this specification. Rather, it is the object of the appended claims to cover all such variations and modifications.

What is claimed is:

1. A power director with electrical surge protection for selectively connecting an electrical power source to multiple electrical apparatus including computers and computer peripherals comprising in combination a housing having front and rear walls, left and right walls and top and bottom surfaces, a plurality of electrical receptacles, each for mating with a power plug of the power cord of an electrical apparatus, located within the housing across the bottom surface between the left and right walls for defining a component bay within the housing between the receptacles and the front wall and a line cord bay within the housing between the receptacles and the rear wall, said line cord bay for storing coiled portions of line cords of multiple electrical apparatus passing into the housing through one or more aperture toward the rear of the housing and having power plugs for mating with the multiple receptacles inside the housing and a component printed circuit board located in the component bay having electrical components mounted thereon including multiple electrical switches electrically coupled to certain of the receptacles for switching on and off electrical power to electrical apparatus having a power plug mated with a receptacle and a power surge protection circuit for protecting said electrical apparatus from excessive power variations.

2. The power director of claim 1 wherein the line cord bay is accessible through the top surface of the housing for installation of a coiled line cord and for the mating of its power plug with a receptacle and wherein the component printed board is accessible through the bottom of the housing for installation and removal of the printed circuit boards.

3. The power director of claim 1 further including pillar means located in the line cord bay for defining a plurality of line cord sub-bays between a receptacle and the rear wall each sub-bay for containing a coiled portion of a power cord while its power plug is mated with an electrical receptacle.

4. The power director of claim 3 wherein the pillar means further includes disk means extending laterally to a sub-bay to retain a coiled line cord in the sub-bay from vertical movement.

5. The power director of claim 4 wherein the top surface of the housing includes a lid above the line cord bay for allowing the installation and removal of power line cords into out of the component sub-bays and including a latch means for mechanically coupling the lid to the disk means.

6. The power director of claim 5 wherein the housing is capable of supporting on the top surface an electrical apparatus weighing at least 70 pounds.

7. The power director of claim 1 wherein the multiple receptacles are electrically coupled to a receptacle printed circuit board for electrically coupling each receptacle to an electrical power source.

8. The power director of claim 7 wherein the housing includes a bottom cover on the bottom surface of the housing below the component bay for allowing the installation and removal of the component and receptacle printed circuit boards into out of the housing.

9. The power director of claim 8 wherein the bottom cover, while positioned in the plane of the bottom surface of the housing, supports the Component and receptacle printed circuit boards against movement within the housing.

10. The power director of claim 7 wherein the two printed boards are manufactured as a single printed board with said electrical components and electrical receptacles mounted thereon which is separated into said component and receptacle printed circuit boards for installation into the housing.

11. The power director of claim 10 wherein multiple electrical conductors are coupled, at the first of each conductor's two ends, at first locations on the receptacle printed circuit board region of the single printed circuit board and, at the second end of each conductor, at second locations on the component printed circuit board region of the single printed circuit board to maintain electrical conducting paths between the two printed circuit boards after the separation of the single printed circuit board into the receptacle printed circuit board and the component printed circuit board.

12. The power director of claim 7 including a frame for mechanically coupling the multiple receptacles to the receptacle printed circuit board.

13. The power director of claim 1 wherein the multiple electrical switches include switch covers that extend through apertures in the front wall of the housing for actuation outside the housing.

14. The power director of claim 13 wherein the component printed circuit board is angled upward from the bottom surface of the housing with the switches and switch covers are mounted on the surface of the board facing the bottom of the housing.

15. The power director of claim 1 wherein the rear wall of the housing includes multiple apertures for the passage therethrough of the line cords of multiple electrical apparatus.

16. The power director of claim 1 further including a convenience receptacle, mechanically coupled to a side wall for mating, outside the housing, with a power plug of a line cord of an electrical apparatus and adapted to be coupled to an electrical power source.

17. The power director of claim 1 further including a flying lead receptacle, located outside the housing, connected to a flying receptacle lead passing through the rear wall of the housing into the line cord bay and extending through the line cord bay to the component bay and adapted to be coupled to an electrical power source.

18. The power director of claim 1 further including a master power line cord including hot, neutral and ground leads extending through a master line cord bay within the housing, passing through an aperture in the rear wall and terminating at a master cord plug for mating with a wall outlet receptacle of an electrical power source.

19. The power director of claim 18 further including a communication printed circuit board located near the rear wall of the housing inside the master line cord bay and having electrical components coupled thereto including communication line jacks positioned in an aperture in a wall of the housing and a communication electrical surge protector circuit for protecting electrical apparatus coupled to the jacks from excessive electrical variations occurring in a communication line coupled to the jacks.

20. The power director of claim 1 further including first and second communication line jacks coupled in series with a communication surge protection circuit, said protection circuit being located inside the housing, the first jack for coupling to a communication line and the second jack for coupling to an electrical apparatus and, the communication surge protection circuit for protecting an electrical apparatus coupled to a jack from excessive electrical variations in a communication line.

21. A power director with electrical surge protection for selectively connecting an electrical power source to multiple electrical apparatus including computers and computer peripherals comprising in combination a housing having front and rear walls, left and right walls and top and bottom surfaces, a receptacle printed circuit board having a plurality of electrical receptacles mounted thereon, each receptacle for mating with a power plug of a power cord of an electrical apparatus, the receptacle printed circuit board and receptacles positioned across the bottom surface between the left and right walls for separating the housing into a component bay and a line cord bay, a plurality of pillar means located in the line cord bay for defining a plurality of line cord sub-bays between the receptacles and the rear wall for containing coiled portions of line cords of electrical apparatus while the power plugs of the cords are mated with electrical receptacles, said pillar means including disk means for limiting vertical movement of coiled portions of line cord within a sub-bay, while the power plug of a line cord is mated with a receptacle, a lid in the top surface of the housing above the line cord bay for permitting the storage of excess portions of line cords mated with the receptacles in the component sub-bays and the removal of line cords from the line cord sub-bays, a component printed circuit board located in the component bay having electrical components mounted thereon including multiple electrical switches having switch covers extending through apertures in the front of the housing for mechanical actuation of the switches from outside the housing, said switches electrically coupled to a master power line cord for switching electrical power on and off to electrical apparatus coupled to the receptacles and a power surge protection circuit for protecting said electrical apparatus from excessive power variations and a cover in the bottom surface of the housing below the bay for permitting the installation and removal into and out of the housing of the receptacle and component printed circuit boards.

22. The power director of claim 21 wherein the plurality of receptacle are mounted on the receptacle printed circuit board by means including a frame mechanically coupled to the receptacles and the printed circuit board.

23. The power director of claim 21 wherein said master power line cord is electrically coupled to at least one of the printed circuit boards, extends through a power line cord bay in the housing to the rear wall, passing through an aperture in the rear wall and terminating at a power cord plug outside the housing for mating with an electrical wall outlet of an electrical power source.

24. The power director of claim 21 further including first and second communication line jacks coupled in series with a communication surge protection circuit, said protection circuit being located inside the housing, the first jack for coupling to a communication line and the second jack for coupling to an electrical apparatus, the communication surge protection circuit for protecting an electrical apparatus coupled to a jack from excessive electrical variations in a communication line.

25. The power director of claim 21 further including a flying lead receptacle, located outside the housing, passing through an aperture in the rear wall, extending through the housing toward the printed circuit boards and electrically coupling with at least one of the printed circuit boards, said flying lead receptacle for coupling, outside the housing, to the plug of a line cord of an electrical apparatus,

26. The power director of claim 21 further including a convenience receptacle mounted in an aperture in one of the side walls of the housing adjacent the receptacle printed circuit board for coupling, outside the housing, with the power plug of a line cord of a electrical apparatus.

27. A power director with electrical surge protection for selectively connecting an electrical power source to multiple electrical apparatus including computers and computer peripherals comprising in combination a housing having front and rear walls, left and right walls and top and bottom surfaces, a receptacle printed circuit board having a plurality of electrical receptacles mounted thereon including by means of a frame fixedly coupled to the receptacle printed circuit board and the receptacles, each receptacle for mating with a power plug of a power cord of an electrical apparatus, the receptacle printed circuit board and frame located generally perpendicular to the bottom surface between the left and right walls for separating the housing into a component bay and a line cord bay, a plurality of pillar means located in the line cord bay for defining a plurality of line cord sub-bays between the receptacles and the rear wall for containing coiled portions of line cords of electrical apparatus while the power plugs of the cords are mated with electrical receptacles, said pillar means including disk means for limiting vertical movement of coiled portions of line cord within a sub-bay, while the power plug of a line cord is mated with a receptacle, a lid in the top surface of the housing above the line cord bay for permitting the storage of excess portions of line cords mated with the receptacles in the component sub-bays and the removal of line cords from the line cord sub-bays, a component printed circuit board located in the component bay having electrical components mounted thereon including multiple electrical switches having switch covers extending through apertures in the front of the housing for mechanical actuation of the switches from outside the housing, said switches electrically coupled to a master power line cord for switching electrical power on and off to electrical apparatus coupled to the receptacles, and a power surge protection circuit for protecting electrical apparatus from excessive power variations, a master power line cord bay located in the housing adjacent a side wall extending from the receptacles to the rear wall of the housing, said master power line cord electrically coupled to at least one of the primed circuit boards, extending through the power line cord bay to the rear wall, passing through an aperture in the rear wall and terminating at a power cord plug outside the housing for mating with an electrical wall outlet of an electrical power source, a flying lead receptacle, located outside the housing, passing through an aperture in the rear wall, extending through the housing toward the printed circuit boards and electrically coupling with at least one of the printed circuit boards, said flying lead receptacle for coupling, outside the housing, to the plug of a line cord of an electrical apparatus, a convenience receptacle mounted in an aperture in one of the side walls of the housing adjacent the receptacle printed circuit board for coupling, outside the housing, with the power plug of a line cord of a electrical apparatus and a cover in the bottom surface of the housing below the component and power line cord bays for permitting the installation and removal into and out of the housing the receptacle printed circuit board, the component printed circuit board and the master power line cord.

* * * * *